US009937416B2

(12) United States Patent
Ayoub et al.

(10) Patent No.: US 9,937,416 B2
(45) Date of Patent: Apr. 10, 2018

(54) ADAPTIVE TOUCH INPUT CONTROLS (71) Applicant: MICROSOFT TECHNOLOGY LICENSING, LLC, Redmond, WA (US)

(72) Inventors: Dan Ayoub, Kirkland, WA (US); Greg Hermann, Renton, WA (US); Michael Ellis, Kirkland, WA (US); Benjamin Cammarano, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 620 days.

(21) Appl. No.: 14/293,990

(22) Filed: Jun. 2, 2014

(65) Prior Publication Data
US 2014/0364214 A1 Dec. 11, 2014

Related U.S. Application Data (60) Provisional application No. 61/833,694, filed on Jun. 11, 2013.

(51) Int. Cl.
*A63F 13/00* (2014.01)
*A63F 13/20* (2014.01)
(Continued)

(52) U.S. Cl.
CPC .............. *A63F 13/06* (2013.01); *A63F 13/10* (2013.01); *A63F 13/2145* (2014.09); *A63F 13/426* (2014.09); *A63F 2300/1018* (2013.01); *A63F 2300/1075* (2013.01); *A63F 2300/6045* (2013.01)

(58) Field of Classification Search
None
See application file for complete search history.

(56) References Cited

U.S. PATENT DOCUMENTS 6,515,689 B1 2/2003 Terashima
6,572,108 B1 6/2003 Bristow
(Continued)

FOREIGN PATENT DOCUMENTS

CN 101681234 A 3/2010
EP 2343638 A2 7/2011
(Continued)

OTHER PUBLICATIONS

IPEA European Patent Office, Second Written Opinion of the International Preliminary Examining Authority Issued in Application No. PCT/US2014/041108, dated May 13, 2015, WIPO, 5 Pages.
(Continued)

*Primary Examiner* — Lawrence Galka
(74) *Attorney, Agent, or Firm* — Alleman Hall Creasman & Tuttle LLP (57) ABSTRACT

Various embodiments relating to providing touch input control of a computing device are disclosed. In one example, responsive to detecting a touch input on a display, a zero point of an adaptive virtual control may be established at a display location of the touch input. Responsive to a translation of the touch input on the display away from the zero point being greater than a radius of the adaptive virtual control, the zero point may be translated.

17 Claims, 7 Drawing Sheets

(51) Int. Cl.
   *A63F 13/426* (2014.01)
   *A63F 13/2145* (2014.01)
   *A63F 13/40* (2014.01)

(56) References Cited

U.S. PATENT DOCUMENTS

| | | | |
|---|---|---|---|
| 7,708,641 B2 | 5/2010 | Tawara | |
| 7,728,820 B2 | 6/2010 | Rosenberg et al. | |
| 7,780,527 B2 | 8/2010 | Gauselmann | |
| 8,354,997 B2 | 1/2013 | Boillot | |
| 2002/0122029 A1 | 9/2002 | Murphy | |
| 2004/0263472 A1* | 12/2004 | Tachikawa | G06F 3/038 345/156 |
| 2006/0052166 A1* | 3/2006 | Ohta | A63F 13/02 436/36 |
| 2006/0111180 A1 | 5/2006 | Cheng | |
| 2007/0018950 A1 | 1/2007 | Ohta | |
| 2007/0265081 A1 | 11/2007 | Shimura et al. | |
| 2008/0309626 A1 | 12/2008 | Westerman et al. | |
| 2009/0205878 A1 | 8/2009 | Taylor | |
| 2009/0207144 A1 | 8/2009 | Bridger | |
| 2010/0156813 A1 | 6/2010 | Duarte et al. | |
| 2011/0172013 A1* | 7/2011 | Shirasaka | G06F 3/0488 463/37 |
| 2011/0276879 A1* | 11/2011 | Ando | A63F 13/42 715/702 |
| 2011/0285636 A1* | 11/2011 | Howard | G06F 3/04815 345/173 |
| 2013/0084980 A1 | 4/2013 | Hammontree et al. | |
| 2013/0093690 A1 | 4/2013 | Papakipos et al. | |
| 2013/0342460 A1* | 12/2013 | Vincent | G06F 3/0338 345/161 |
| 2014/0066195 A1* | 3/2014 | Matsui | A63F 13/42 463/30 |
| 2015/0154728 A1* | 6/2015 | Nara | G06F 3/0488 345/157 |

FOREIGN PATENT DOCUMENTS

| | | |
|---|---|---|
| JP | H11164175 A | 6/1999 |
| JP | 2006139615 A | 6/2006 |
| JP | 2008217548 A | 9/2008 |
| JP | 2009025848 A | 2/2009 |
| JP | 2010073071 A | 4/2010 |
| JP | 2010530578 A | 9/2010 |
| KR | 1020080076200 A | 8/2008 |
| KR | 1020100027311 A | 3/2010 |
| KR | 1020100134339 A | 12/2010 |
| WO | 2007055213 A | 5/2007 |
| WO | 2010075136 A2 | 7/2010 |
| WO | 2012133254 A2 | 10/2012 |

OTHER PUBLICATIONS

European Patent Office, International Search Report & Written Opinion for PCT Patent Application No. PCT/US2014/041108, dated Sep. 11, 2014, 10 Pages.
IPEA European Patent Office, International Preliminary Report on Patentability Issued in Application No. PCT/US2014/041108, dated Sep. 29, 2015, WIPO, 7 Pages.
"Engineering ROBLOX for the Ipad, Part 4 (Control Design)", Published on Nov. 19, 2012 Available at: http://blog.roblox.com/2012/11/engineering-roblox-for-the-ipad-part-4-control-design/.
Viciana-Abad, R. et al., "Difficulties Using Passive Haptic Augmentation in the Interaction within a Virtual Environment," Proceedings of the 8th Annual International Workshop on Presence (PRESENCE 2005), Sep. 21, 2005, London, United Kingdom, 6 pages.
ISA Korean Intellectual Property Office, International Search Report and Written Opinion Issued in Application No. PCT/US2011/067426, dated Sep. 27, 2012, WIPO, 9 pages.
United States Patent and Trademark Office, Office Action Issued in U.S. Appl. No. 12/981,139, dated Oct. 3, 2013, 14 pages.
State Intellectual Property Office of the People's Republic of China, First Office Action Issued in Application No. 201110448471.5, dated Feb. 25, 2014, 17 pages.
United States Patent and Trademark Office, Office Action Issued in U.S. Appl. No. 12/981,139, dated Jun. 2, 2014, 17 pages.
United States Patent and Trademark Office, Office Action Issued in U.S. Appl. No. 12/981,139, dated Sep. 18, 2014, 18 pages.
State Intellectual Property Office of the People's Republic of China, Second Office Action Issued in Application No. 201110448471.5, dated Jan. 20, 2015, 6 pages.
United States Patent and Trademark Office, Office Action Issued in U.S. Appl. No. 12/981,139, dated Apr. 1, 2015, 17 pages.
State Intellectual Property Office of the People's Republic of China, Notice of Allowance Issued in Application No. 201110448471.5, dated Jul. 31, 2015, 6 pages.
United States Patent and Trademark Office, Office Action Issued in U.S. Appl. No. 12/981,139, dated Sep. 4, 2015, 19 pages.
Japan Patent Office, Office Action Issued in Application No. 2013-547623, dated Jan. 5, 2016, 5 pages. (Submitted with Partial Translation).
United States Patent and Trademark Office, Notice of Allowance Issued in U.S. Appl. No. 12/981,139, dated Mar. 28, 2016, 9 pages.
Taiwan Intellectual Property Office, Office Action and Search Report Issued in Application No. 100143766, dated Jun. 7, 2016, 8 pages. (Submitted with Translation of Search Report).
United States Patent and Trademark Office, Corrected Notice of Allowance Issued in U.S. Appl. No. 12/981,139, dated Jul. 7, 2016, 2 pages.

* cited by examiner

ADAPTIVE TOUCH INPUT CONTROLS

CROSS REFERENCE TO RELATED APPLICATIONS

This application claims priority to U.S. Provisional Patent Application No. 61/833,694, filed Jun. 11, 2013, the entirety of which is hereby incorporated herein by reference.

BACKGROUND

Some touch input gaming applications may employ virtual control sticks or virtual joysticks as part of a control scheme that enables a player to provide touch input to control a video game. For example, two virtual control sticks may be displayed in a fixed position at lower corners of a touch input display screen of a mobile or hand-held computing machine. Typically, the virtual control sticks may be controlled by a player's thumbs. In particular, these input areas may have fixed centers (or zero points) and limited radial maximums in which touch input may be suitably interpreted to control the virtual control sticks. During the course of game play, the player's thumbs may drift from the fixed positions of the virtual control sticks and beyond the radial maximums. This may result in the player losing control of the video game. As such, the player may have to repeatedly reset their thumbs on the fixed positions of the virtual control sticks in order to regain control of the video game. Such repeated loss of control and thumb readjustment may result in reduced control accuracy, and lower overall player satisfaction.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to providing touch input control of a computing device are disclosed. In one example, responsive to detecting a touch input on a display, a zero point of an adaptive virtual control may be established at a display location of the touch input. Responsive to a translation of the touch input on the display away from the zero point being greater than a radius of the adaptive virtual control, the zero point may be translated.

DETAILED DESCRIPTION

This disclosure relates to a touch input control scheme of a video game displayed on a touch-screen computing machine. More particularly, this disclosure relates to adaptive virtual control sticks that enable a player to provide touch input to control a video game. The control scheme may be configured to adjust a position of the adaptive control sticks on the touch input display screen to follow touch input of a player. In other words, as a player's fingers slide across the touch input display screen, the virtual control sticks move with the player's fingers. Such a configuration may reduce a likelihood of a player losing control of a video game, due to the player's fingers not being aligned with the virtual control sticks. In this way, control accuracy of the video game may be increased, as well as overall player satisfaction.

Figure 1:
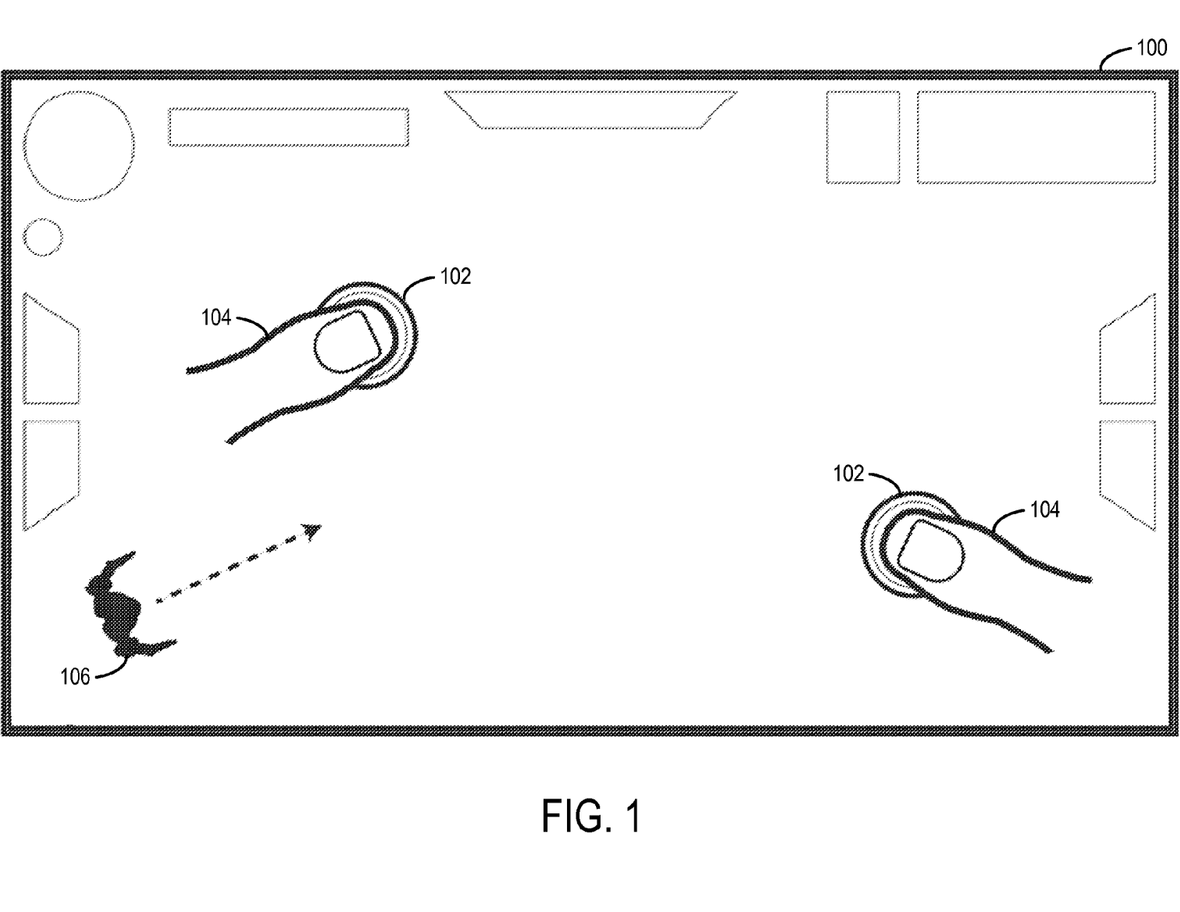
FIG. 1 shows a touch input display screen of a gaming computing machine according to an embodiment of this disclosure.

FIG. 1 shows a touch input display screen 100 of a gaming computing machine that employs an adaptive virtual control stick control scheme according to an embodiment of this disclosure. Adaptive virtual control sticks 102 may be displayed on the touch input display screen 100 aligned with a player's thumbs 104. The player may move their thumbs to manipulate the adaptive virtual control sticks to control a video game or some other application. In the illustrated embodiment, the player controls the adaptive virtual control sticks to control a space ship 106. The adaptive virtual control sticks may be configured to move with the player's touch input to allow for increased freedom of touch input control, and to allow for use of the entire surface area of the touch input display screen. For example, in the illustrated embodiment, because the left adaptive virtual control stick moves with the player's left thumb, the space ship may be able to be displayed in the lower left corner of the screen. In configurations with fixed virtual control sticks, that area would typically be occupied by a virtual control stick or covered by a thumb, and thus the space ship could not be viewed at that space.

The adaptive virtual control sticks 102 may be positioned in areas around locations of initial or default touch points of the player's thumbs 104. For example, an adaptable virtual control stick may have a radius that is slightly larger than a player's thumb, so that the adaptable virtual control stick may be visible when the thumb is providing touch input. As described herein, a radius of an adaptive virtual control stick is defined as a length from a zero point of the adaptive virtual control stick to a perimeter of the adaptive virtual control stick. The radius/perimeter may be used to determine when to translate the zero point of the adaptive virtual control stick on a display. In some implementations, the radius may define a control area of the adaptive virtual control stick. It will be understood that the radius need not align with a displayed graphic of the adaptive virtual control stick. For example, the radius may define an invisible control area that is smaller or larger than the displayed area of the adaptive virtual control stick. In some implementations, the radius may be fixed or predetermined. In some implementations, the radius may be dynamically determined. For example, the radius may be dynamically determined based on a size of a player's finger or other object that provides the touch input. In one particular example, the radius may be dynamically set to be slightly larger than the touch contact patch made by the player's finger against the touch display screen. It is to be understood that the adaptable virtual control sticks may take any suitable size and form without departing from the scope of this disclosure.

The initial touch points of the player's thumbs may establish 'zero' points for the adaptable virtual control sticks from which translation may be interpreted radially for touch input control. In some embodiments, such translations may be interpreted to provide a direction of control. For example, such translations may be interpreted according to a four-way directional control scheme including up, down, left, and right. In another example, such translations may be interpreted according to an eight-way directional control scheme including up, down, left, right, diagonally up and to the left, diagonally up and to the right, diagonally down and to the left, and diagonally down and to the right. In some embodiments, such translation may be interpreted in more than eight directions (e.g., any suitable angle θ from 0-360°. In some embodiments, such translations may be interpreted to provide a variable magnitude of directional movement. For example, a translational distance from the zero point may be measured to determine a magnitude of directional translation up to a radial maximum of an adaptive virtual control stick. In some cases, the magnitude may correspond to a rate of travel of an object of control in a video game. It is to be understood that any suitable touch input control scheme may be employed without departing from the scope of this disclosure.

In some embodiments, the adaptive virtual control sticks may be persistently displayed. For example, the adaptive virtual control sticks may be displayed in a default position, such as in the lower corners of touch input display screen when the player is not touching the touch input display screen, in order to provide some guidance to the player to provide touch input. In some embodiments, the adaptive virtual control sticks may be displayed responsive to touch input. In other words, the adaptive virtual control sticks may not be displayed when the player is not providing touch input. In some embodiments, the adaptive virtual control sticks may be displayed when the player is not providing touch input, and the adaptive virtual control sticks may not be displayed when the player is providing touch input. In some embodiments, the adaptive virtual control sticks may not be displayed at all or may be invisible.

The adaptable virtual control sticks may be configured such that touch translations exceeding the radial maximum of an adaptive virtual control stick may be interpreted as a shift in the zero point of the adaptable virtual control stick. For example, when a touch input translation exceeds the radial maximum of an adaptive virtual control stick (e.g., in the next display frame), the adaptive virtual control stick may be shifted so that the radial maximum is aligned with the touch input and the zero point is offset from the touch input by a radial distance of the adaptive virtual control stick. Moreover, additional translational movement may be interpreted relative to the last touch input position. Such a control scheme may naturally deliver on user expectations, and adjustments to the zero point may allow a player to interact with a wider range of touch input display screen surface area.

In some implementations, a displayed portion of an adaptive virtual control stick may be centered on a zero point of the adaptive virtual control stick. In other implementations, a displayed portion of an adaptive virtual control stick may be offset from a zero point of the adaptive virtual control stick. For example, a displayed portion of an adaptive virtual control stick may have an uneven shape that causes the zero point to be offset.

FIGS. 2-6 show a sequence of touch inputs and corresponding adaptive virtual control stick movements that produce directional input. According to the illustrated control scheme, translational movement of the touch input may be interpreted as a direction of control (e.g., up, down, left, right).

Figure 2:
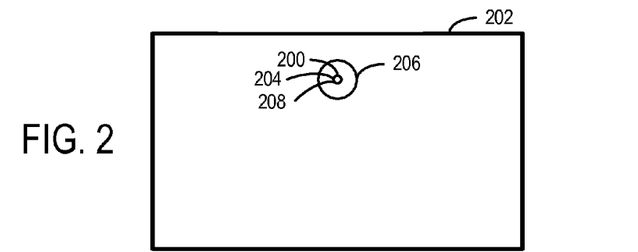
FIGS. 2-6 show a sequence of touch inputs and corresponding adaptive virtual control stick movements that produce directional input.

In FIG. 2, a touch input 200 may be provided to a touch input display screen 202 to establish an initial touch input position 204. An adaptive virtual control stick 206 may be aligned with the touch input 200. In particular, the initial touch input position 204 may correspond to a zero point 208 of the adaptive virtual control stick 206. Because the touch input 200 is aligned with the zero point 208, the touch input may be interpreted as not registering in any particular direction.

Figure 3:
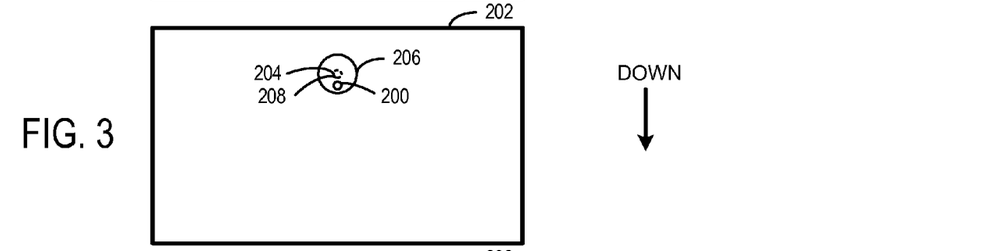

In FIG. 3, the touch input 200 is translated downward from the initial touch input position 204, and within the radius of the adaptive virtual control stick 206. Because, the touch input does not exceed the radial maximum of the adaptive virtual control stick, the adaptive virtual control stick remains in the same place, and the zero point 208 remains aligned with the initial touch input position 204. The translation of the touch input 200 relative to the zero point 208 may be interpreted as a directional input in the DOWN direction.

Figure 4:
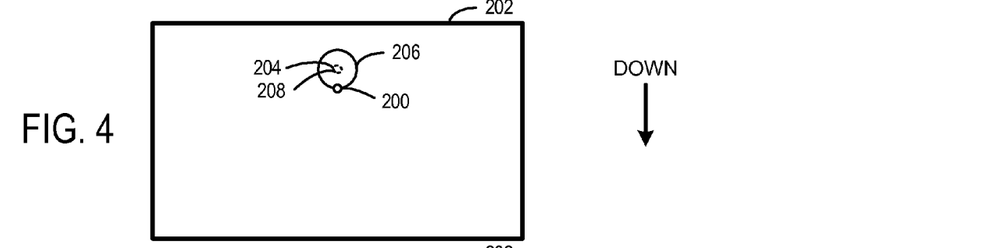

In FIG. 4, the touch input 200 is translated downward from the previous touch input position, and to the radial maximum of the adaptive virtual control stick 206. Because, the touch input does not exceed the radial maximum of the adaptive virtual control stick, the adaptive virtual control stick remains in the same place, and the zero point 208 remains aligned with the initial touch input position 204. The translation of the touch input 200 relative to the zero point 208 may be interpreted as a directional input in the DOWN direction.

Figure 5:
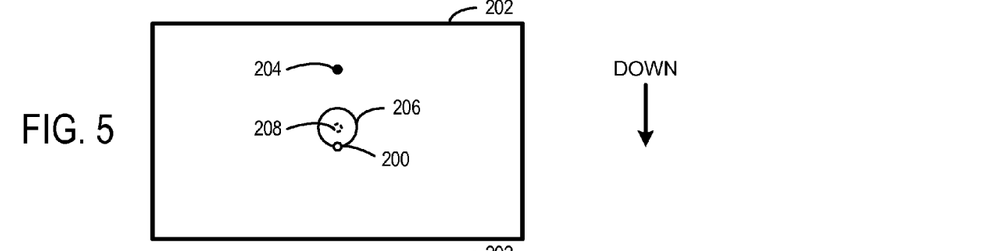

In FIG. 5, the touch input 200 is translated downward from the previous touch input position, and beyond the radial maximum of the adaptive virtual control stick 206. Because, the touch input exceeds the radial maximum of the adaptive virtual control stick, the adaptive virtual control stick may be shifted relative to the previous display frame, so that the touch input 200 may be aligned with the radial maximum of the adaptive virtual control stick. The zero point 208 may be offset from the touch input 200 by the radius of the adaptive virtual control stick. Moreover, the zero point 208 is translated downward from the initial touch input position 204. The translation of the touch input 200 relative to the zero point 208 may be interpreted as a directional input in the DOWN direction.

Figure 6:
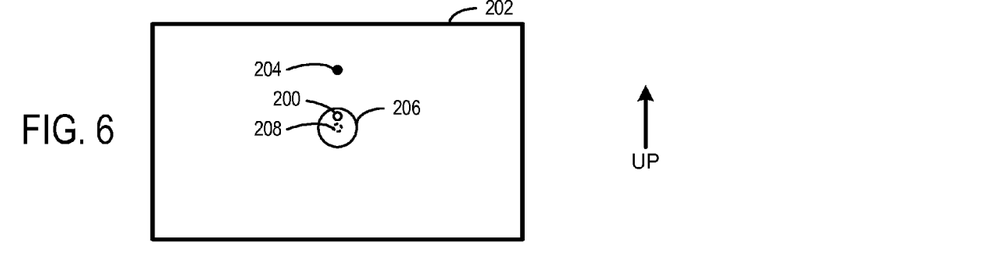

In FIG. 6, the touch input 200 is translated upward from the previous touch input position, and within the shifted radial maximum of the adaptive virtual control stick 206. Because, the touch input does not exceed the radial maximum of the adaptive virtual control stick, the adaptive virtual control stick is not shifted relative to the previous display frame. The translation of the touch input 200 relative to the zero point 208 may be interpreted as a directional input in the UP direction, because translational movement may be interpreted relative to the last input position.

FIGS. 7-11 show a sequence of touch inputs and corresponding adaptive virtual control stick movements that produce variable magnitude directional input. According to the illustrated control scheme, translational movement of the touch input may be interpreted as a magnitude of movement in a direction of control. In particular, the magnitude may be represented as a percentage of a total possible magnitude of movement in a particular direction.

Figure 7:
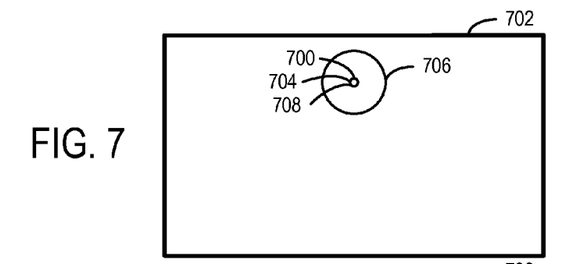
FIGS. 7-11 show a sequence of touch inputs and corresponding adaptive virtual control stick movements that produce variable magnitude directional input.

In FIG. 7, a touch input 700 may be provided to a touch input display screen 702 to establish an initial touch input position 704. An adaptive virtual control stick 706 may be aligned with the touch input 700. In particular, the initial touch input position 704 may correspond to a zero point 708 of the adaptive virtual control stick 706. Because the touch input 700 is aligned with the zero point 708, the touch input may be interpreted as not registering in any particular direction and having zero magnitude.

Figure 8:
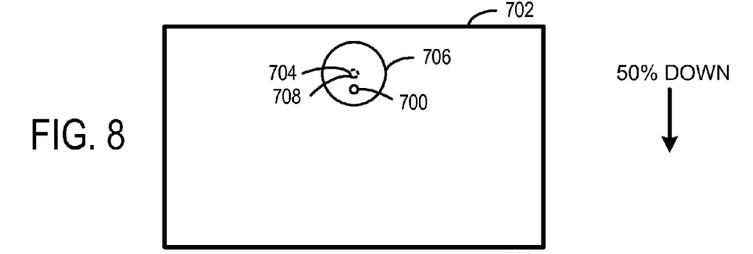

In FIG. 8, the touch input 700 is translated downward from the initial touch input position 704, and within a radius of the adaptive virtual control stick 706. In particular, the touch input 700 is positioned halfway between the initial touch input position 704 and the radius of the adaptive virtual control stick 706. A length of the radius may define a range of the magnitude. As such, the relative position of the touch input 700 between the initial touch input 704/zero point 708 and the radius determines the magnitude of the directional input to be 50%. Because, the touch input does not exceed the radial maximum of the adaptive virtual control stick, the adaptive virtual control stick remains in the same place, and the zero point 708 remains aligned with the initial touch input position 704. The translation of the touch input 700 relative to the zero point 708 may be interpreted as a directional input in the DOWN direction with a magnitude of 50%.

Figure 9:
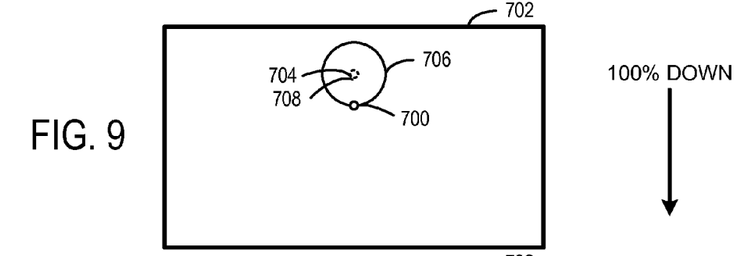

In FIG. 9, the touch input 700 is translated downward from the previous touch input position, and to the radial maximum of the adaptive virtual control stick 706. In particular, the touch input 700 is positioned at the radial maximum of the adaptive virtual control stick 706. As such, the relative position of the touch input 700 between the initial touch input 704/zero point 708 and the radius determines the magnitude of the directional input to be 100%. Because, the touch input does not exceed the radial maximum of the adaptive virtual control stick, the adaptive virtual control stick remains in the same place, and the zero point 708 remains aligned with the initial touch input position 704. The translation of the touch input 700 relative to the zero point 708 may be interpreted as a directional input in the DOWN direction with a magnitude of 100%.

Figure 10:
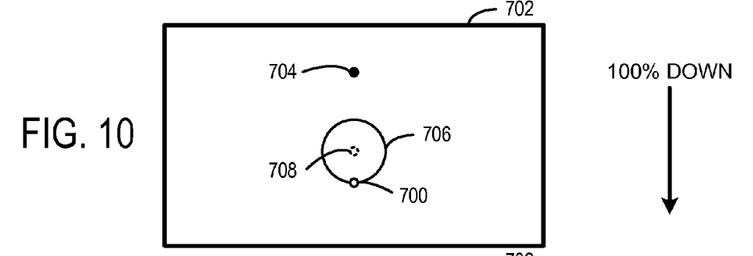

In FIG. 10, the touch input 700 is translated downward from the previous touch input position, and beyond the radial maximum of the adaptive virtual control stick 706. In this example, since the magnitude of the directional input reaches a maximum when the touch input is positioned at the radial maximum of the adaptive virtual control stick, the magnitude of directional input remains at 100% even as the touch input translates beyond the radius of the adaptive virtual control stick. Because, the touch input exceeds the radial maximum of the adaptive virtual control stick, the adaptive virtual control stick may be shifted (e.g., relative to the previous display frame), so that the touch input 700 may be aligned with the radial maximum of the shifted adaptive virtual control stick. The zero point 708 may be offset from the touch input 700 by the radius of the shifted adaptive virtual control stick. Moreover, the zero point 708 is translated downward from the initial touch input position 704. The translation of the touch input 700 relative to the zero point 708 may be interpreted as a directional input in the DOWN direction with a magnitude of 100%. In other words, when a translation exceeds the radial maximum of the adaptive virtual control stick, the magnitude of the translation may be interpreted as having a magnitude of 100%.

Figure 11:
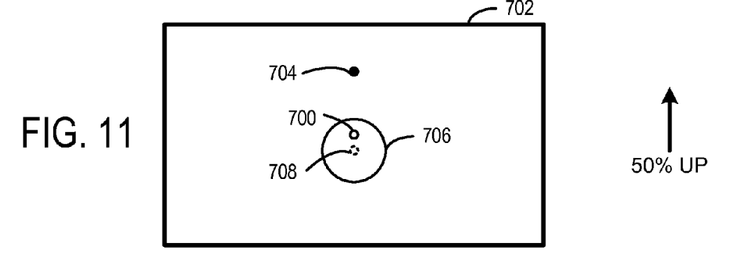

In FIG. 11, the touch input 700 is translated upward from the previous touch input position, and within the shifted radial maximum of the adaptive virtual control stick 706. In particular, the touch input 700 is positioned halfway between the zero point 708 and the radius of the shifted adaptive virtual control stick 706. As such, the relative position of the touch input 700 between the zero point 708 and the radius of the shifted adaptive virtual control stick determines the magnitude of the directional input to be 50%. Because, the touch input does not exceed the radial maximum of the adaptive virtual control stick, the adaptive virtual control stick is not shifted relative to the previous display frame. The translation of the touch input 700 relative to the zero point 708 may be interpreted as a directional input in the UP direction with a magnitude of 50%, because translational movement may be interpreted relative to the last input position.

Note that the radius of the adaptive virtual control stick 706 shown in FIGS. 7-11 may be greater than a radius of the adaptive virtual control stick 206 shown in FIGS. 2-6. The radius may be increased in order to provide enough space for a player to perceive a level of granularity of control when adjusting a magnitude of movement in a direction. It is to be understood that an adaptive virtual control stick may have any suitable radius without departing from the scope of this disclosure.

In the above described examples, a magnitude of a directional input may be adjusted linearly within a range defined between a zero point and a radius of the adaptive virtual control stick. It will be understood that a magnitude of any suitable input parameter to control a computing device may be adjusted via touch input in any suitable fashion without departing from the scope of the present disclosure.

Figure 12:
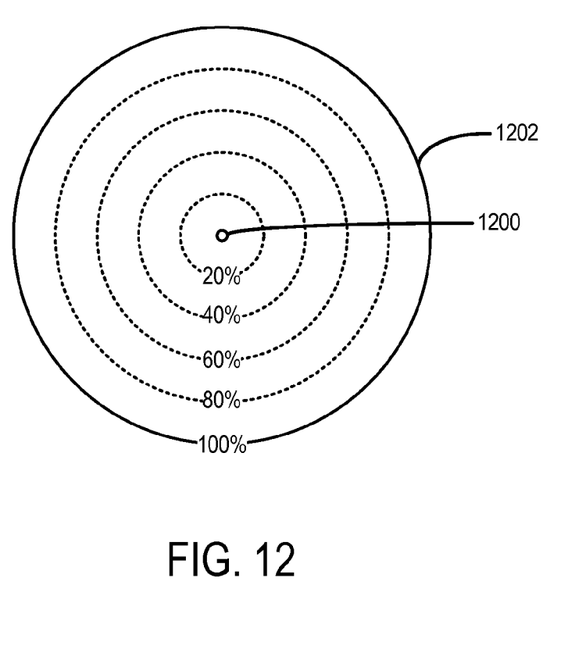
FIG. 12 shows an example linear control function for directional input provided by touch input to an adaptive virtual control.
Figure 13:
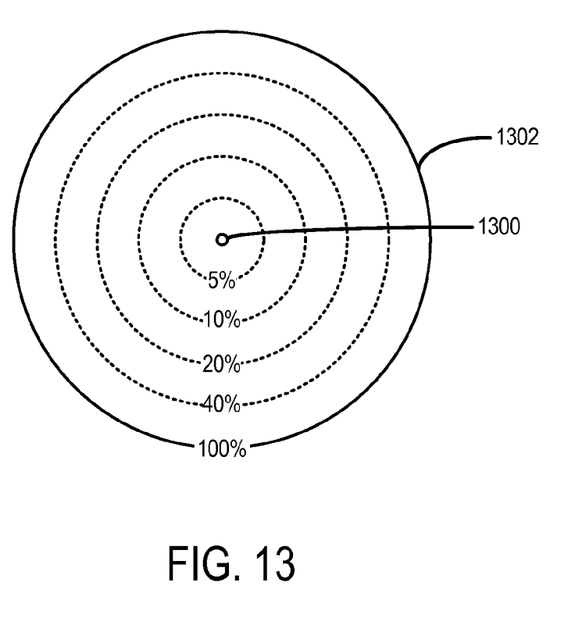
FIG. 13 shows an example non-linear control function for directional input provided by touch input to an adaptive virtual control.

FIGS. 12 and 13 show example control functions for adjusting a magnitude of an input parameter provided by touch input to an adaptive virtual control stick. FIG. 12 shows an example linear control function in which a magnitude of an input parameter increases linearly between a zero point 1200 and a radius 1202 of an adaptive virtual control stick. A plurality of dashed rings are equally spaced between the zero point 1200 and the radius 1202. Note that the dashed rings are shown for purposes of illustration and may not actually be displayed as part of the adaptive virtual control stick. Each dashed ring represents the same increase in magnitude across the range of magnitude (e.g., 0-100%). In other words, as a touch input translates away from the zero point 1200 and towards the radius 1202, a magnitude of the input parameter may increase linearly up to 100%. Likewise, as a touch input translates away from the radius 1202 and towards the zero point 1200, a magnitude of the input parameter may decrease linearly down to 0.

FIG. 13 shows an example non-linear control function in which a magnitude of an input parameter increases non-linearly between a zero point 1300 and a radius 1302 of an adaptive virtual control stick. A plurality of dashed rings are equally spaced between the zero point 1300 and the radius 1302. Note that the dashed rings are shown for purposes of illustration and may not actually be displayed as part of the adaptive virtual control stick. Each dashed ring represents a different increase in magnitude across the range of magnitude (e.g., 0-100%). In this example, a relative change in magnitude between dashed rings may decrease as a touch input moves closer to the zero point 1300 from the radius 1302. In this way, a player may have finer control of touch input around the zero point. In another example, a relative change in magnitude between dashed rings may increase as a touch input moves closer to the zero point from the radius. In these examples, the magnitude changes non-linearly across the range of magnitude as a touch input moves between the zero point 1300 and the radius 1302.

Figure 14:
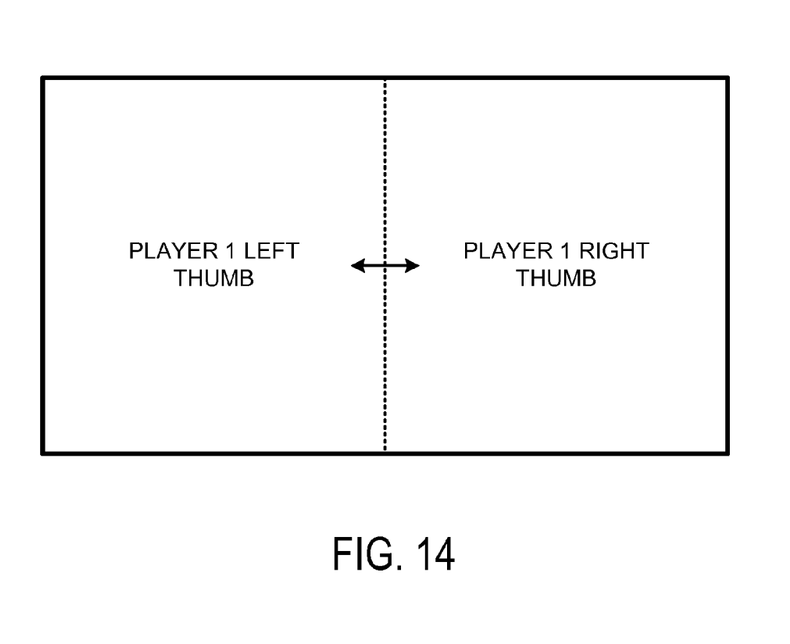
FIG. 14 shows a touch input screen divided into different control areas for a single player control scheme.

In some embodiments, the touch input display screen may be divided into different areas that may be associated with different adaptable virtual control sticks. FIG. 14 shows a touch input screen divided into different control areas for a single player control scheme. In particular, the touch input display screen may be divided into two invisible contextual areas corresponding to a left thumb and a right thumb. The left area associated with the left thumb may allow the player to touch anywhere in the left area to create an adaptive virtual left control stick that provides control associated with the left control stick. The right area associated with the right thumb may allow the player to touch anywhere in the right area to create an adaptive virtual right control stick that provides control associated with the right control stick. The touch input display screen may be divided into different left and right areas because different controls may be associated with different control sticks. For example, a left control stick may control translation of an object and a right control stick may control rotation of the object.

In the illustrated embodiment, the touch input display screen is divided into two evenly sized areas. It will be appreciated that the touch input display screen may be divided unevenly between the two areas. Moreover, the size of the areas may change relative to a position of a touch input. Further, a size and/or position of the areas on the display screen may change based on an orientation of the display screen. For example, the areas may be larger when the display screen is oriented in a landscape orientation relative to a size of the areas when the display screen is oriented in a portrait orientation. Furthermore, it is to be understood that the touch input display screen may be divided into any suitable number of different areas associated with different adaptable virtual control sticks without departing from the scope of this disclosure.

Figure 15:
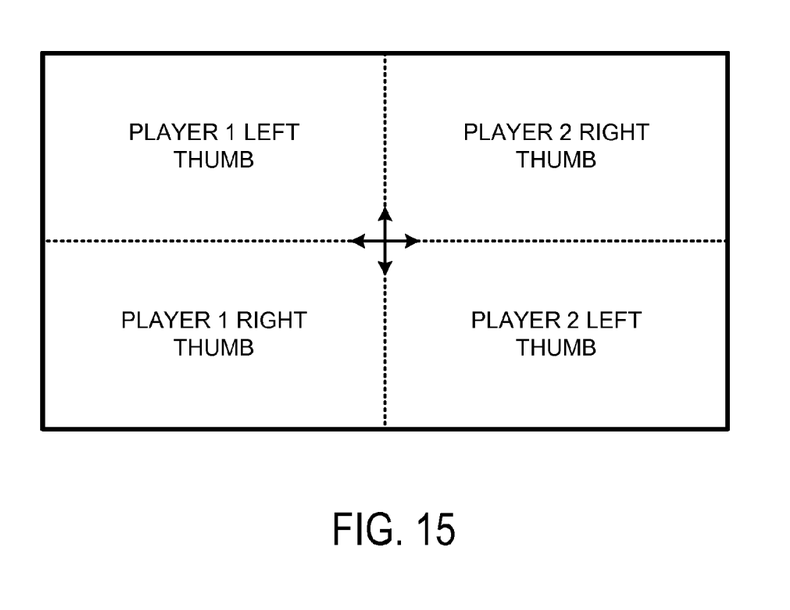
FIG. 15 shows a touch input screen divided into different control areas for a multi-player control scheme.

FIG. 15 shows a touch input screen divided into different control areas for a multi-player control scheme. In particular, the touch input display screen may be divided into four invisible contextual areas corresponding to two different players. In particular an upper left quadrant may be associated with a left thumb of a first player and a lower left quadrant may be associated with a right thumb of the first player. Further, an upper right quadrant may be associated with a right thumb of a second player and a lower right quadrant may be associated with a left thumb of the second player. Each area associated with a player may allow the player to touch anywhere in the area to create an adaptive virtual control stick that provides control associated with that particular control stick.

In the illustrated embodiment, the touch input display screen is divided into four evenly sized areas. It will be appreciated that the touch input display screen may be divided unevenly between the four areas. Furthermore, the orientation of the players relative to the touch input display screen may change without departing from the scope of this disclosure.

Figure 16:
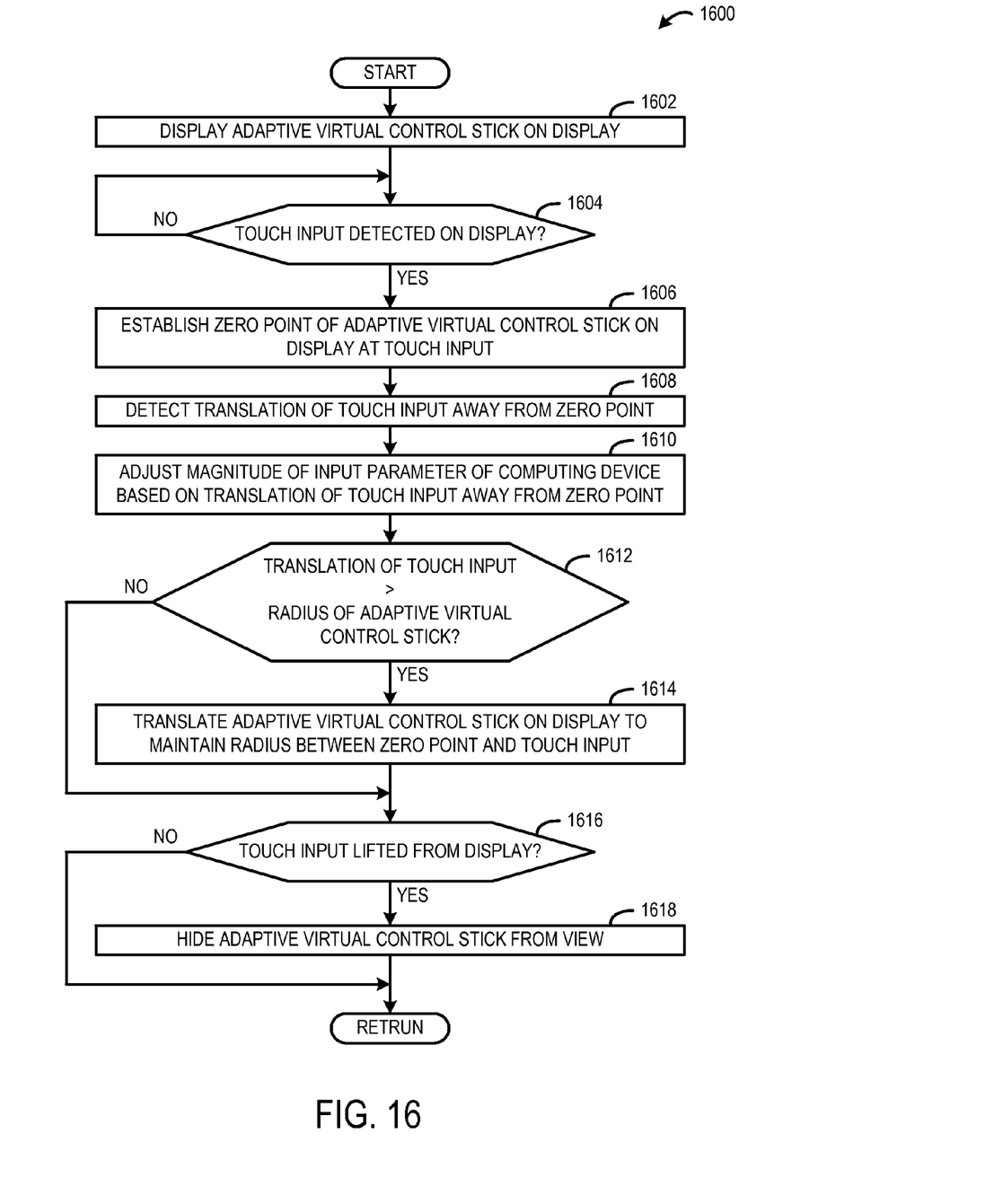
FIG. 16 shows a flow chart of an example method for providing touch input control of a computing device.

FIG. 16 shows a flow chart of an example method 1600 for providing touch input control of a computing device. More particularly, the method 1600 may be performed to provide one or more adaptive virtual control sticks on a display that enables a player to provide touch input control of a computing device. For example, the method may be performed by a computing device, such as the computing device 1700 shown in FIG. 17.

In some implementations, at 1602, the method 1600 may include displaying an adaptive virtual control stick on a display. In some implementations, the adaptive virtual control stick may be displayed persistently on the display. In some implementations, the adaptive virtual control stick may be displayed at a default position on the display prior to detecting a touch input. In this way, a player may know where to place his/her touch input on the display to initially align with the adaptive virtual control stick. In other implementations, the adaptive virtual control stick may not be displayed until a touch input on the display is detected.

At 1604, the method 1600 may include determining whether a touch input is detected on the display. If a touch input is detected on the display, then the method moves to 1606. Otherwise, the method returns to 1604.

At 1606, the method 1600 may include establishing a zero point of the adaptive virtual control stick on the display at the touch input. The zero point may be a point from which translation may be interpreted radially for touch input control of the computing device.

At 1608, the method 1600 may include detecting translation of the touch input away from the zero point. For example, while the player maintains his/her touch input on the display, the player may translate his/her touch input in different directions to provide different control adjustments (e.g., move up, move down, move left, move right, etc.).

At 1610, the method 1600 may include adjusting a magnitude of an input parameter of the computing device based on the translation of the touch input on the display away from the zero point. In some implementations, the magnitude may be adjusted linearly based on a relative position of the translation of the touch input between the zero point and the radius. In some implementations, the magnitude may be adjusted non-linearly based on a relative position of the translation of the touch input between the zero point and the radius. For example, a change in magnitude may be increased as the touch input moves closer to the zero point. In this way, a player may have finer granularity of control around the zero point. In some implementations, the method may include adjusting a direction of an input parameter of the computing device based on a direction the touch input translates from the zero point within the radius.

At 1612, the method 1600 may include determining whether the translation of the touch input is greater than a radius of the adaptive virtual control stick. If the translation of the touch input is greater than the radius of the adaptive virtual control stick, then the method 1600 moves to 1614. Otherwise, the method moves to 1616.

In some implementations, the radius of the adaptive virtual control stick may be a predetermined value. In other words, the adaptive virtual control stick may always be the same size. In some implementations, the radius of the adaptive virtual control stick may be dynamically determined based on a size of an object that provides the touch input. For example, a size of the adaptive virtual control stick may be dynamically adjusted to fit a size of the player's finger that provides the touch input. In one particular example, the radius may be sized to be slightly larger than the player's finger. In this way, the player is able to view the control stick while providing the touch input.

At 1614, the method 1600 may include translating the adaptive virtual control stick a distance on the display to maintain the radius between the zero point and the touch input. It will be understood that the adaptive virtual control stick may be translated repeatedly with each translation of the touch input away from the shifted zero point that is greater than the radius. Further, each translation of the adaptive virtual control stick may be interpreted relative to the most recent touch input position. In other words, the adaptive virtual control stick may be controlled via a feedback loop where each time the zero point of the adaptive virtual control stick translates greater than the radius away from the zero point, the zero point is translated so that a distance between the touch input and the zero point does not exceed the radius of the adaptive virtual control stick.

At 1616, the method 1600 may include determining whether the touch input has lifted from the display. If the touch input has lifted from the display, then the method 1600 moves to 1618. Otherwise, the method 1600 returns to other operations.

In some implementations, at 1618, the method may include hiding the adaptive virtual control stick responsive to the touch input being lifted from the display. In other implementations, the method may include returning the adaptive virtual control stick to a default position on the display responsive to the touch input being lifted from the display.

By shifting a position of the adaptive control stick on the display to follow touch input of a player, a likelihood of a player losing control of a computing device due to the player's finger not being aligned with the adaptive virtual control stick may be reduced. In this way, control accuracy of the computing device via touch input may be increased.

It will be understood that the above described method may be performed to provide a plurality of adaptive virtual control sticks on a display. In one implementation, a method may include responsive to detecting a first touch input anywhere in a first designated portion of a display, establishing a zero point of a first adaptive virtual control stick on the display at the touch input.

The method may further include responsive to detecting a second touch input anywhere in a second designated portion of the display different than the first designated portion, establishing a zero point of a second adaptive virtual control stick on the display at the second touch input.

In some implementations, the display may be subdivided equally into the first portion and the second portion. In some implementations, the first portion and the second portion may be the same size. Further, the first and second portions may not overlap such that each portion occupies a differ space on the display.

The method may further include responsive to a translation of the first touch input on the display away from the zero point of the first adaptive virtual control stick being greater than a radius of the first adaptive virtual control stick, translating the first adaptive virtual control stick on the display to maintain the radius between the zero point and the first touch input.

The method may further include responsive to a translation of the second touch input on the display away from the zero point of the second adaptive virtual control stick being greater than a radius of the second adaptive virtual control stick, translating the second adaptive virtual control stick on the display to maintain the radius between the zero point and the second touch input.

The method may further include adjusting a magnitude of a first input parameter of the computing device based on a translation of the first touch input on the display away from the zero point of the first virtual adaptive control stick.

The method may further include adjusting a magnitude of a second input parameter of the computing device different than the first parameter based on a translation of the second touch input on the display away from the zero point of the second virtual adaptive control stick.

In some embodiments, the methods and processes described herein may be tied to a computing system of one or more computing devices. In particular, such methods and processes may be implemented as a computer-application program or service, an application-programming interface (API), a library, and/or other computer-program product.

Figure 17:
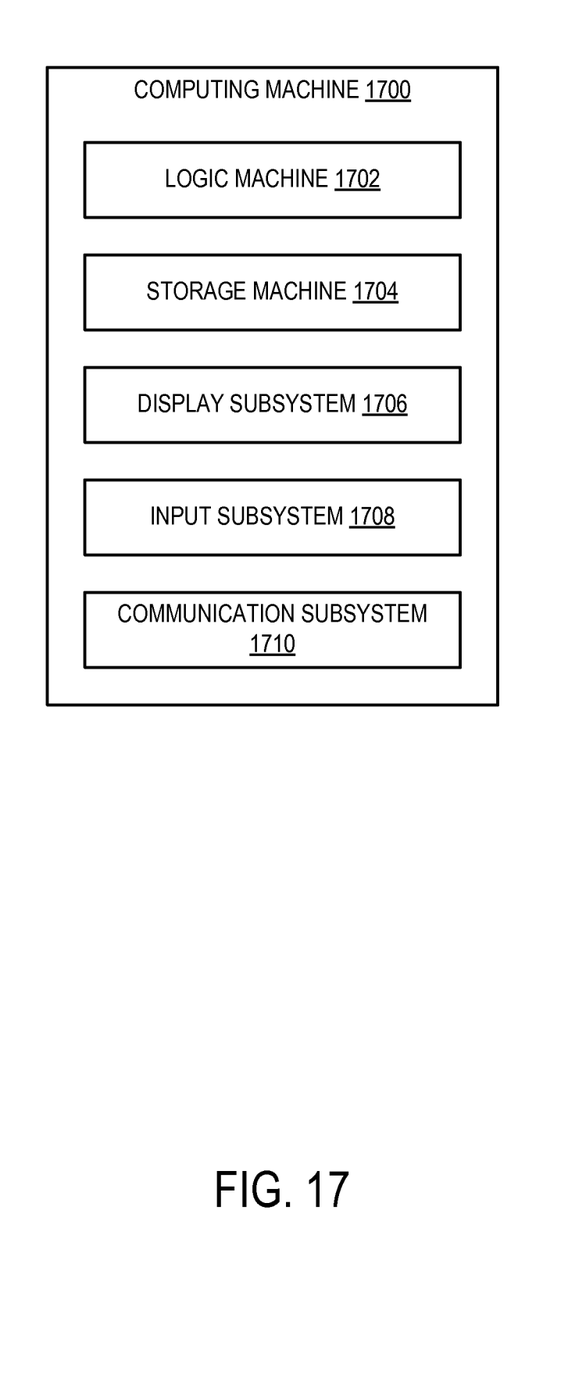
FIG. 17 shows a computing system according to an embodiment of this disclosure.

FIG. 17 schematically shows a non-limiting embodiment of a computing system 1700 that can enact one or more of the methods and processes described above. Computing system 1700 is shown in simplified form. Computing system 1700 may take the form of one or more personal computers, server computers, tablet computers, home-entertainment computers, network computing devices, gaming devices, mobile computing devices, mobile communication devices (e.g., smart phone), and/or other computing devices.

Computing system 1700 includes a logic machine 1702 and a storage machine 1704. Computing system 1700 may optionally include a display subsystem 1706, input subsystem 1708, communication subsystem 1710, and/or other components not shown in FIG. 17.

Logic machine 1702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1704 includes one or more physical devices configured to hold instructions executable by the logic machine to implement the methods and processes described herein. When such methods and processes are implemented, the state of storage machine 1704 may be transformed—e.g., to hold different data.

Storage machine 1704 may include removable and/or built-in devices. Storage machine 1704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1704 may include volatile, nonvolatile, dynamic, static, read/write, read-only, random-access, sequential-access, location-addressable, file-addressable, and/or content-addressable devices.

It will be appreciated that storage machine 1704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1702 and storage machine 1704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1706 may be used to present a visual representation of data held by storage machine 1704. This visual representation may take the form of a graphical user interface (GUI). As the herein described methods and processes change the data held by the storage machine, and thus transform the state of the storage machine, the state of display subsystem 1706 may likewise be transformed to visually represent changes in the underlying data. Display subsystem 1706 may include one or more display devices utilizing virtually any type of technology. Such display devices may be combined with logic machine 1702 and/or storage machine 1704 in a shared enclosure, or such display devices may be peripheral display devices.

Furthermore, display subsystem 1706 may include one or more touch-screen display devices utilizing any suitable touch detection technology. Non-limiting examples of touch detection technologies that may be implemented in a touch-screen display may include resistive touch detection, capacitive touch detection, and optical touch detection.

When included, input subsystem 1708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1710 may be configured to communicatively couple computing system 1700 with one or more other computing devices. Communication subsystem 1710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for providing touch input control of a computing device, the method comprising:
   based on detecting a touch input on a display, establishing a zero point of an adaptive virtual control at the display location of the touch input and establishing a radius that is dynamically sized based on a size of an object that provides the touch input, the radius defining a radial maximum distance of translation away from the zero point;
   based on a translation of the touch input on the display away from the zero point being less than the radius, adjusting an input parameter of the computing device; and
   based on a translation of the touch input on the display away from the zero point being greater than the radius of the adaptive virtual control, translating the zero point.

2. The method of claim 1, wherein the zero point is translated so that a distance between the touch input and the zero point does not exceed the radius of the adaptive virtual control.

3. The method of claim 1, further comprising:
   displaying the adaptive virtual control while the touch input is on the display; and
   hiding the adaptive virtual control based on the touch input being lifted from the display.

4. The method of claim 1, further comprising:
   displaying the adaptive virtual control persistently on the display.

5. The method of claim 4, further comprising:
   prior to detecting the touch input, displaying the adaptive virtual control at a default position on the display; and
   returning the adaptive virtual control to the default position based on the touch input being lifted from the display.

6. The method of claim 1, further comprising:
   adjusting a direction of the input parameter of the computing device based on a direction the touch input translates from the zero point within the radius.

7. The method of claim 1, further comprising:
   adjusting a magnitude of the input parameter of the computing device based on a distance the touch input translates from the zero point within the radius.

8. The method of claim 7, wherein the magnitude is adjusted linearly based on a relative position of the translation of the touch input between the zero point and the radius.

9. The method of claim 7, wherein the magnitude is adjusted non-linearly based on a relative position of the translation of the touch input between the zero point and the radius.

10. A storage machine holding instructions executable by a logic machine to:
    based on detecting a touch input on a display, establish a zero point of an adaptive virtual control at a display location of the touch input and establish a radius that is dynamically sized based on a size of an object that provides the touch input, the radius defining a radial maximum distance of translation away from the zero point;

based on a translation of the touch input on the display away from the zero point being less than the radius, adjust an input parameter of the computing device; and based on a translation of the touch input on the display away from the zero point being greater than the radius, translate the zero point.

11. The storage machine of claim 10, wherein the adaptive virtual control is displayed at a default position on the display prior to detecting the touch input; and wherein the adaptive virtual control is changed to the default position on the display based on the touch input being lifted from the display.

12. The storage machine of claim 10, further holding instruction executable by the logic machine to:

adjusting a magnitude of the input parameter of a computing device based on a translation of the touch input on the display away from the zero point.

13. The storage machine of claim 12, wherein the magnitude is adjusted linearly based on a relative position of the translation of the touch input between the zero point and the radius.

14. The storage machine of claim 12, wherein the magnitude is adjusted non-linearly based on a relative position of the translation of the touch input between the zero point and the radius.

15. A method for providing touch input control of a computing device, the method comprising:

prior to detecting a touch input on a display, displaying the adaptive virtual control at a default position on the display;

based on detecting the touch input on the display, establishing a zero point of an adaptive virtual control at a display location of the touch input and establish a radius that is dynamically sized based on a size of an object that provides the touch input, the radius defining a radial maximum distance of translation away from the zero point;

based on a translation of the touch input on the display away from the zero point being less than the radius, adjusting an input parameter of the computing device;

based on a translation of the touch input on the display away from the zero point being greater than a radius of the adaptive virtual control, translating the zero point so that a distance between the touch input and the zero point does not exceed the radius of the adaptive virtual control; and hiding the adaptive virtual control based on the touch input being lifted from the display.

16. The method of claim 15, further comprising:

adjusting a direction of the input parameter of the computing device based on a direction the touch input translates from the zero point within the radius.

17. The method of claim 15, further comprising:

adjusting a magnitude of the input parameter of the computing device based on a distance the touch input translates from the zero point within the radius.

* * * * *